(12) United States Patent
Tsai

(10) Patent No.: US 8,406,610 B2
(45) Date of Patent: Mar. 26, 2013

(54) SYSTEMS AND METHODS OF EDITING MEDIA DATA

(75) Inventor: Yao Tsung Tsai, Tainan (TW)

(73) Assignee: Cyberlink Corp., Shindian, Taipei (TW)

( * ) Notice: Subject to any disclaimer, the term of this patent is extended or adjusted under 35 U.S.C. 154(b) by 117 days.

(21) Appl. No.: 13/095,084

(22) Filed: Apr. 27, 2011

(65) Prior Publication Data

US 2012/0275770 A1 Nov. 1, 2012

(51) Int. Cl.
| G11B 27/00 | (2006.01) |
| H04N 5/93 | (2006.01) |
| H04N 5/77 | (2006.01) |
| H04N 5/775 | (2006.01) |
| H04N 9/80 | (2006.01) |
| H04N 7/14 | (2006.01) |

(52) U.S. Cl. ........ 386/280; 386/223; 386/225; 386/226; 386/230; 386/242; 386/278; 386/282

(58) Field of Classification Search .......... 386/223, 386/225, 226, 230, 242, 278, 280, 282; 348/14.03, 348/14.07, 14.08, 14.09, 14.14

See application file for complete search history.

(56) References Cited

U.S. PATENT DOCUMENTS

| 5,592,599 | A * | 1/1997 | Lindholm .............. 345/427 |
| 8,270,488 | B2 * | 9/2012 | Connery et al. ........ 375/240.13 |
| 2002/0003943 | A1 * | 1/2002 | Shimizu ............... 386/69 |
| 2006/0251292 | A1 | 11/2006 | Gokturk et al. |
| 2008/0148176 | A1 * | 6/2008 | Mita .................. 715/781 |
| 2009/0201314 | A1 * | 8/2009 | Tanaka et al. .......... 345/629 |

OTHER PUBLICATIONS

A time-based method and apparatus of video editing, Sony Vegas implemented similar functions http://www.sonycreativesoftware.com/news/article.asp?articleid=77&keycode=64141.

* cited by examiner

Primary Examiner — Daquan Zhao
(74) Attorney, Agent, or Firm — McClure, Qualey & Rodack, LLP

(57) ABSTRACT

Systems and methods of editing media data are described. One such method includes displaying a representation of a first and second media data instances. Each media data instance is displayed along a corresponding one of a plurality of lines at a corresponding one of a plurality of positions. The corresponding position is chosen in accordance with a capture time associated with the media data instances, such that when the media data instances have overlapping capture times the media data instances with overlapping capture times are displayed on different ones of the lines. The method further includes determining an overlap region for the first media and second media data instances having overlapping capture times. The method further includes combining a plurality of frames within the overlap region of the first media data instance and the second media data instance according to an overlap style to produce an output media data.

29 Claims, 8 Drawing Sheets

SYSTEMS AND METHODS OF EDITING MEDIA DATA

CROSS REFERENCE TO RELATED APPLICATIONS

Not applicable.

TECHNICAL FIELD

The present disclosure generally relates to processing of media data and more particularly relates to systems and methods for editing media data.

BACKGROUND

Digital video cameras have become so common that an individual may use more than one video camera to record the same event. A video editing tool may be used to combine the media data from various cameras into a single instance of media data. However, the process of selecting frames and/or segments from particular files for inclusion into the combined file is cumbersome and time consuming with conventional video editing tools.

SUMMARY

Embodiments of the present invention provide a friendly user interface and methodology in media editing to edit and generate time-based media data, such as video files. Various embodiments are described for time-based editing of media data. One embodiment is a method which includes displaying a representation of first media data and second media data. Each of the first and second media data are displayed along a corresponding one of a plurality of lines at a corresponding one of a plurality of positions. The corresponding position is chosen in accordance with a capture time associated with the media data, such that when the media data have overlapping capture times the media data with overlapping capture times are displayed on different ones of the lines. The method further includes determining an overlap region for a first and a second of the media data having overlapping capture times. The method further includes combining a plurality of frames within the overlap region of the first media data and the second media data according to an overlap style to produce an output media data.

Another embodiment is a computing device which includes memory and a processor. The memory has executable instructions stored thereon. The processor is configured by at least a portion of the executable instructions retrieved from the memory to display a representation of a first media data and a second media data. Each of the media data is displayed along a corresponding one of a plurality of lines at a corresponding one of a plurality of positions. Each corresponding position is chosen in accordance with a capture time associated with the media data, such that when the media data have overlapping capture times the media data with overlapping capture times are displayed on different ones of the lines. When the first media data and the second media data have overlapping capture times, an overlap region for the first media data and the second media data is determined. A plurality of frames within the overlap region is combined according to an overlap style to produce an output media data. The first media data and the second media data are captured from different sources.

Still another embodiment is a system including at least one computing device and an executable in the at least one computing device. The executable includes logic that displays a representation of a first media data and a second media data. Each of the media data is displayed along a corresponding one of a plurality of lines at a corresponding one of a plurality of positions. Each corresponding position is chosen in accordance with a capture time associated with the media data, such that when the media data have overlapping capture times the media data with overlapping capture times are displayed on different ones of the lines. The executable also includes logic that determines an overlap region for the first media data and the second media data, and logic that combines a plurality of frames within the overlap region according to an overlap style to produce an output media data. The first media data and the second media data are captured from different sources.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
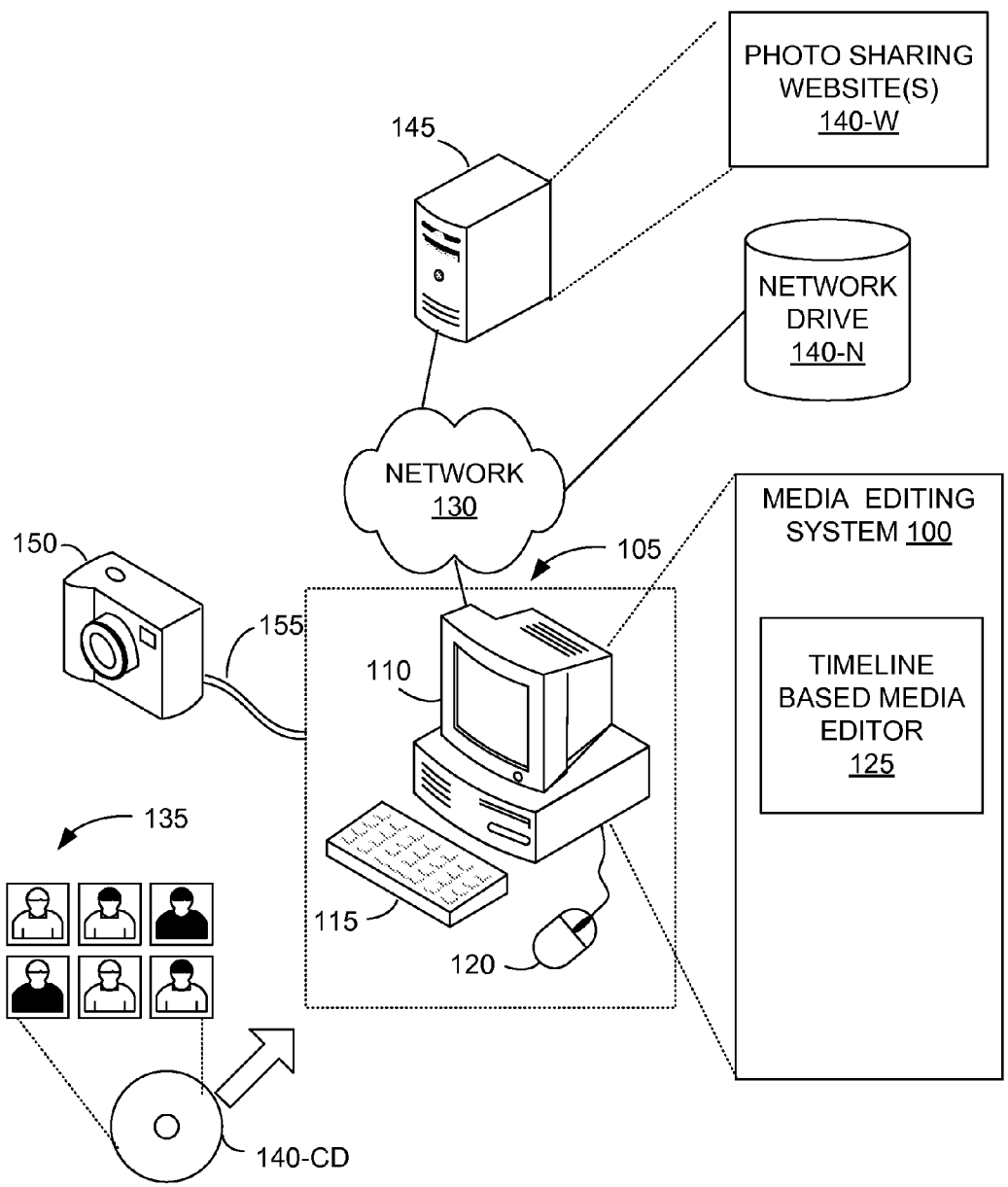
FIG. 1 is a high-level block diagram of a system including a media editing system, according to some embodiments

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

As described earlier, using conventional editing tools to produce a single output file from multiple files is cumbersome. Navigating through multiple instances of media data to select frames or segments in a video stream is time consuming. Similarly, navigating through multiple still image files to select a set of photos is time consuming. The present disclosure generally relates to editing media, and more particularly relates to time-based systems and methods of editing media. As used herein, the term "media stream" describes video streams as well as multimedia streams, in which video is intermixed with audio, graphics, and/or data streams. Media data describes, for example, files that include video streams, files that include multimedia streams, files that include a series of still images (i.e., a "slideshow"), and files that include digital photos.

Embodiments of the disclosed systems and methods simultaneously present multiple media data to the user. The media data instances from different devices are displayed on different rows within a timeline, aligned by the actual (clock) time and/or date of video capture. Where each instance of media data may have its own internal elapsed time, the clock time used in the disclosed systems and methods has a base or reference that is common to all the files shown. Thus, if all the instances captured the same event from 12:00 PM to 12:18 PM, the timeline would show 12:00 PM to 12:18 PM, even if the instances captured by individual cameras might show an elapsed time of 18 minutes. By displaying media data simultaneously, each one relative to the same actual capture time, the user can easily appreciate timing relationships between media data and/or segments within media data. This can be especially beneficial when the data represent the same event as captured by multiple video cameras.

Furthermore, the simultaneous display of multiple instances of media data relative to the same timeline allows the user to easily appreciate regions in which media data overlap in time, i.e., time periods which are covered by more than one media data. When the time period for one media data overlaps with the time period for another media data, such that more than one source is available for the same time period, the disclosed systems and methods may apply a particular style to frames within the overlap period. For example, the frame from one media data input captured at a particular time may be tiled with the corresponding frame from another media data input. Embodiments of the disclosed systems and methods generate a media data output containing frames from multiple media data, including the frames created by applying styles to the overlap region. In this manner, embodiments of the disclosed systems and methods allow a user to combine multiple instances of media data in a manner which takes into account the time relationships between instances of media data that capture the same event.

FIG. 1 is a high-level block diagram of a system including a media editing system according to some embodiments. The system includes a media editing system 100 embodied in a computing device 105 (e.g., a desktop computer, computer workstation, laptop, notebook, tablet computer, or a personal electronics device such as a media player, web pad, game player, phone, messaging device, etc.). Media editing system 100 includes a display 110 and input devices such as a keyboard 115 and/or a pointing device 120. Media editing system 100 also includes a time-based media editor 125 which can be implemented in software, in specialized hardware logic, or a combination thereof.

In some embodiments, media editing system 100 is coupled via a wired or wireless communication path to a network 130, such as the Internet or a local area network (LAN). Media editing system 100 retrieves media data 135 and allows the user to edit the media data 135 to produce a media data output which combines frames from different media data inputs. In some embodiments, media data 135 are retrieved from a local or remote storage device. Examples of local storage include a compact disc (CD) reader 140-CD and a flash drive (not shown). Examples of remote storage include a network drive 140-N, video editing system 100, or a photo sharing website 140-W that is hosted on a server 145. In some embodiments, media data 135 are provided to media editing system 100 by an image capture device 150, such as a digital camera, via an interface or connection 155. Media editing system 100 may support a number of conventional computer interfaces, such as (but not limited to) IEEE-1394 High Performance Serial Bus (Firewire), universal serial bus (USB), a serial connection, and a parallel connection. As one of ordinary skill will appreciate, media data 135 may be encoded in any number of formats, including (but not limited to) JPEG (Joint Photographic Experts Group) files, TIFF (Tagged Image File Format) files, PNG (Portable Network Graphics) files, GIF (Graphics Interchange Format) files, and BMP (bitmap) files. Having introduced example functionality that is provided by media editing system 100 introduced above, these components will now be described in more detail.

Figure 2:
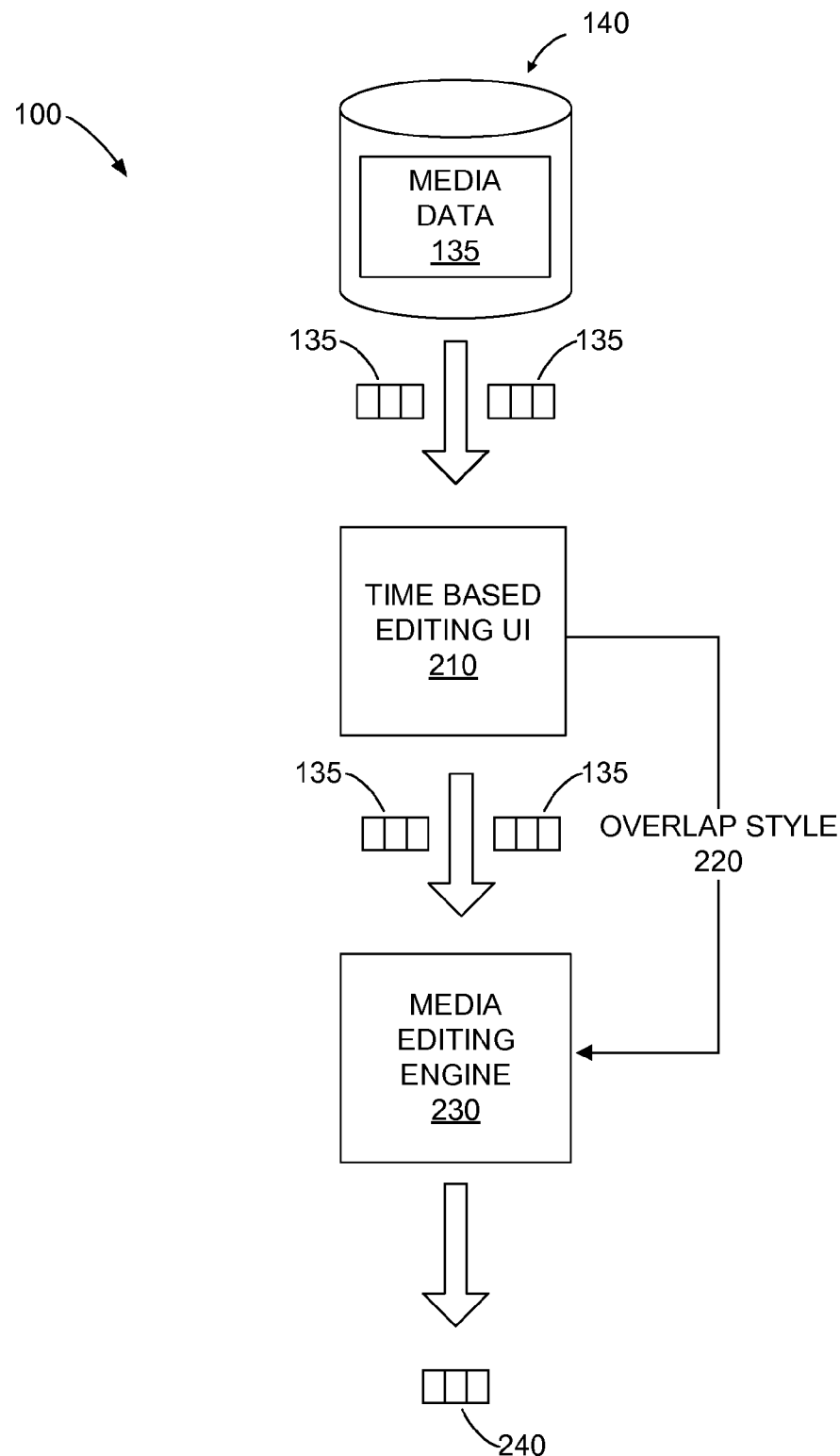
FIG. 2 is a block diagram illustrating selected components of the media editing system of FIG. 1, and the interaction between these components, according to some embodiments.

FIG. 2 is a block diagram illustrating selected components of media editing system 100, and the interaction between these components, according to some embodiments. A time-based media editing user interface 210 allows a user to select multiple media data 135 from storage device 140. Time-based media editing user interface 210 displays the selected media data 135 in a timeline format so that a user can recognize which media data 135 overlap in time. Time-based media editing user interface 210 also allows the user to select a style 220 for overlap, audio, and/or slideshow for application to an overlapping region of the media data 135. Examples of styles 220 for overlap treatment include, for example, tiling, picture-in-picture, multiple angle, etc. A video editing engine 230 takes the selected media data 135 as input and combines the frames in the media data in accordance with the style to produce a media data output 240. Media data output 240 contains newly created frames in the time overlap region as well as a portion of frames from the original input media data 135. Styles 220 and their application by video editing engine 230 to generate media data output 240 will be described in more detail below.

Figure 3:
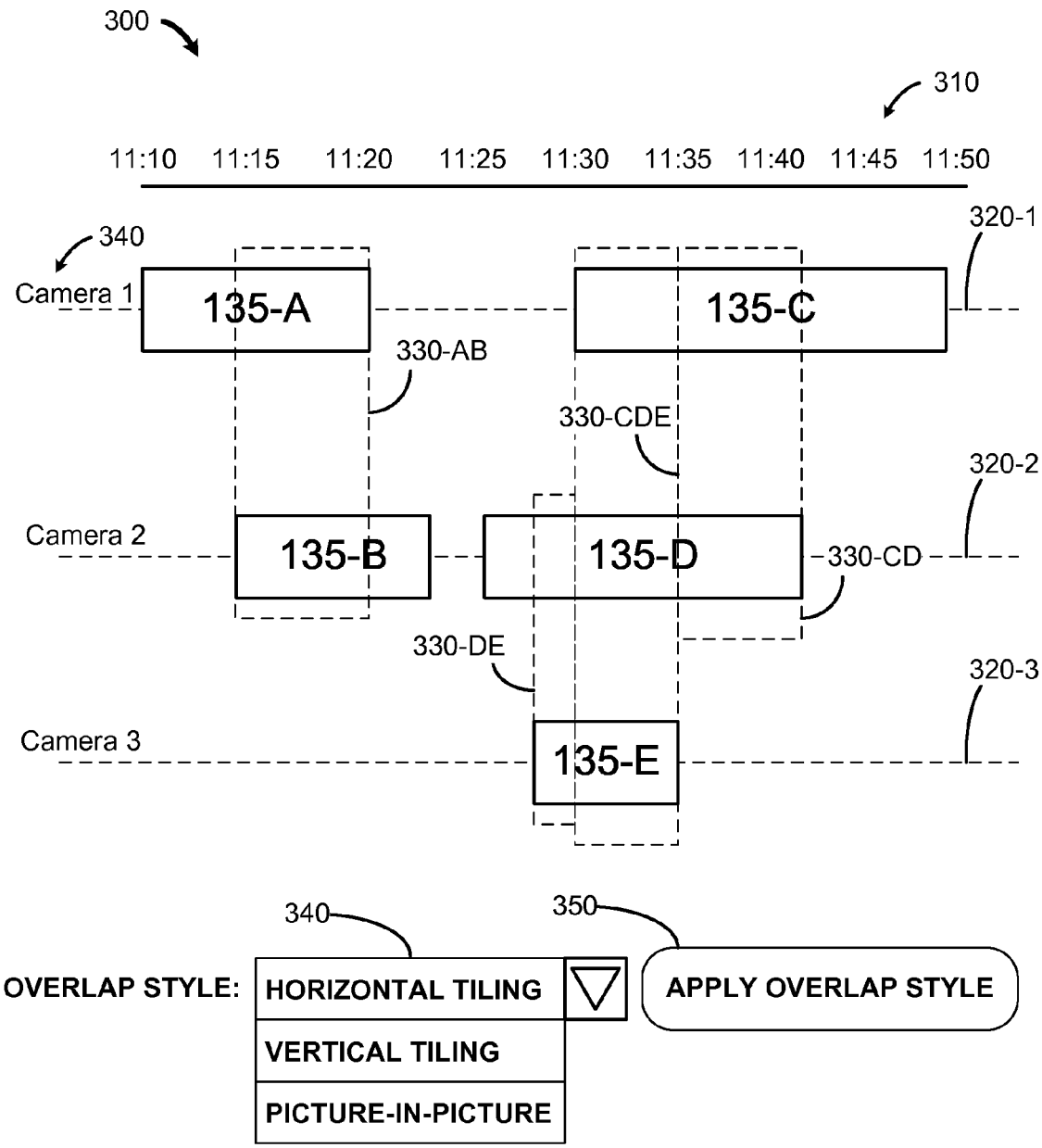
FIG. 3 illustrates an example user interface screen or window generated by the time-based media editing user interface of FIG. 2, according to some embodiments.

FIG. 3 illustrates an example user interface screen or window generated by time-based media editing user interface 210, according to some embodiments. Window 300 includes a timeline 310 and media data 135 that are arranged in rows 320. Rows 320 are aligned with timeline 310. More specifically, time-based media editing user interface 210 places each media data instance 135 on one of the rows 320 so that the media data instance 135 is aligned appropriately with timeline 310, according to its capture time. That is, a media data instance 135-A captured between 11:10 and 11:20 is displayed as a linear segment where the start of the linear segment aligns with the 11:10 mark on timeline 310, and the end of the linear segment aligns with the 11:20 mark on timeline 310. Furthermore, if the capture time of one media data instance 135 overlaps with the capture time of another media data instance 135, time-based media editing user interface 210 places these media data instances 135 on different rows 320. By displaying media data instance 135 in this manner, overlap regions 330 which overlap in time are apparent to the user.

Through user interface 210, the user selects two or more media data inputs 135 to be combined into a media data output 240, in the manner described below. The inputs 135 selected for inclusion in the output 240 may be less than all the media data 135 that are displayed on timeline 310. For example, if four media data inputs 135 are displayed on timeline 310, the user may choose only the first and the third media data input 135 for inclusion in the output 240, thus excluding the second and the fourth media data input 135 from the output 240. The inputs 135 displayed on timeline 310 and selected by the user may originate from different devices. List control 340 allows the user to select an style for overlap, audio, and/or slideshow modifications. When the user clicks button 350, media editing engine 230 combines the frames in the selected media data 135 in accordance with the style to produce media data output 240. The process of applying a style to multiple media data instances 135 will be described in more detail below.

In the example of FIG. 3, time-based media editing user interface 210 arranges five media data instances (135-A to 135-E) in three rows (320-1 to 320-3) beneath timeline 310. In some embodiments, instances of media data 135 corresponding to different devices are shown on different rows. In other embodiments, media data corresponding to different storage locations (e.g., folders, disks, etc.) are shown on different rows. For example, media data 135-A and 135-C may be captured by a first device and/or stored in a first folder, media data 135-B and 135-D may be captured by a second device and/or stored in a second folder, and media data 135-E may be captured by a third device three and/or stored in a third folder.

In the example of FIG. 3, timeline 310 spans the period from 11:10 to 11:50. The capture time of media data 135-A is 11:10 to 11:20, and the capture time of media data 135-B is 11:15 to 11:22. Thus, media data 135-B overlaps in time with media data 135-A, in overlap region 330-AB, and as a result time-based media editing user interface 210 places media data 135-B on a different row (320-2) than media data 135-A. A row 320 may include a label 340 (340 in FIG. is a button for applying overlap style) with identifying information such as device or camera name, folder name, etc. In some embodiments, label 340 is user-editable.

As can also be seen in FIG. 3, the capture time of media data 135-C is 11:30 to 11:50 and time-based media editing user interface 210 places media data 135-C on row 320-1. The capture time of media data 135-D is 11:26 to 11:42. Therefore, media data 135-D overlaps in time with media data 135-C, in overlap region 330-CD. Time-based media editing user interface 210 therefore places media data 135-D on a different row (320-2) than media data 135-C. Finally, the capture time of media data 135-E is 11:27 to 11:34. Media data 135-E thus overlaps with both media data 135-C and media data 135-D, in overlap region 330-CDE. Media data 135-E also overlaps with media data 135-D (but not 135-C) in overlap region 330-DE. To handle the overlap, time-based media editing user interface 210 arranges media data 135-E on a different row (320-3) than either media data 135-C or media data 135-D.

Time-based media editing user interface 210 may use various rules in deciding the order in which instances of media data 135 are distributed to rows 320. Thus, although the approach used by time-based media editing user interface 210 in the example of FIG. 3 resulted in media data 135-C, 135-D, and 135-E being placed on rows 320-1, 320-2, and 320-3, another approach might instead result in a different arrangement. Any distribution approach is allowed which ensures that media data instances which overlap in time are on different rows. As one example, the order in which time-based media editing user interface 210 distributes media data instances to rows may use a criteria which is related to capture time, for example, in increasing order of capture time, increasing order of modification time, etc. As another example, order in which time-based media editing user interface 210 distributes media data instances to rows may use a criteria which is related to file characteristics, such as file modify date, file name, file directory, etc.

Some embodiments of time-based media editing user interface 210 allow a user to edit timestamps in a media data instance, which may be useful if timestamps in the file are not accurate, or if the capture device does not keep accurate time. In some embodiments, timestamps are edited by dragging a selected media data along the timeline to another time. For example, in FIG. 3 where media data 135-C spans the time period from 11:30 to 11:50, a user can drag the media data 135-C to 11:25. In some embodiments, timestamps are directly edited via user input. For example, the user may select an instance of media data shown in window 300 and enter a new starting and/or ending timestamp.

The examples above referred to video instances, which are made up of multiple frames and thus have a inherent time duration. Still images or photos are made of single frames, and thus do not have an inherent time duration. To handle still photos, time-based media editing user interface 210 may associate a still photo with a predefined duration. The still photo duration may be specified by the user for each photo, or a default value may be used. User interface 210 treats a still photo with a duration of X minutes as a video of the same duration. Thus, the still photo spans X minutes on timeline 310. In this manner, time-based media editing user interface 210 enlarges the overlap region of a still photo to fill the duration associated with the still photo. In addition to associating a duration with a still photo, a user may also edit the capture time of a still photo. Since a still photo is displayed on timeline 310 in the same way a video is displayed, the time editing techniques described above in the context of video can also be used for still photos.

The example window 300 shows a horizontal arrangement of media files 135 and timeline 310. In other embodiments, the arrangement may be vertical instead. Furthermore, the user interface window may include other controls, buttons, menus, dialogs, etc. which are not shown in FIG. 3. For example, window 300 may include a mechanism which allows a user to select media data instances 135 for placement on the timeline, a mechanism which allows a user to select style 220 from a group of pre-defined styles, a mechanism which allows a user to define styles, a mechanism which allows the user to generate media data output 240 from the displayed media data instances 135, etc.

Figure 4:
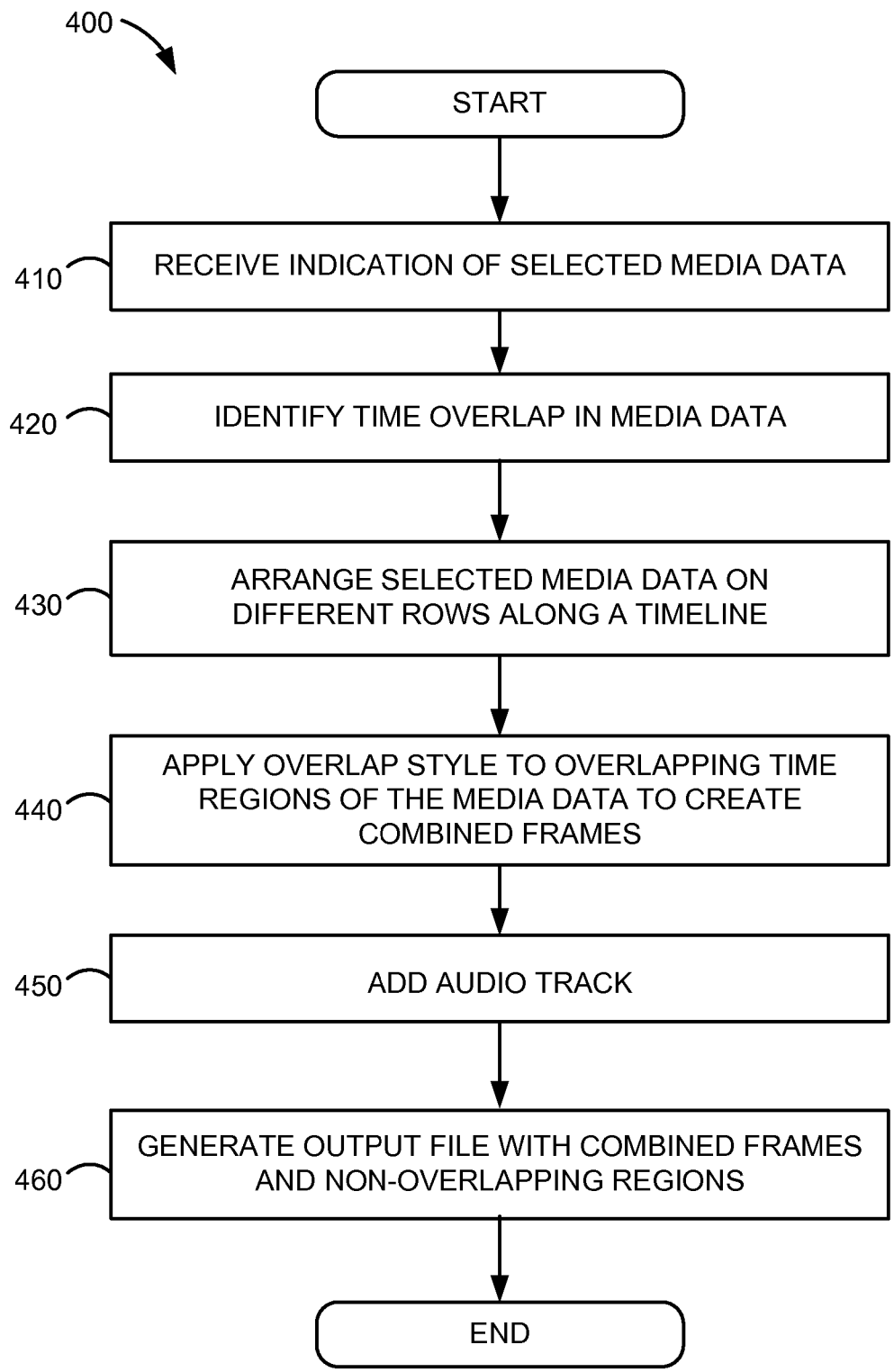
FIG. 4 is a flowchart describing a representative method performed by some embodiments of the time based media editor of FIG. 2, according to some embodiments.

FIG. 4 is a flowchart describing a representative method performed by some embodiments of time-based media editor 125. Method 400 begins at block 410 where editor 125 receives an indication of a media data instance 135 selected by a user. At block 420, time-based media editor 125 identifies which, if any, of media data instances 135 overlap with each other in time. Time overlap can be determined by looking at a capture start time and stop time for each media data instance 135. Next, at block 430, editor 125 arranges representations of the selected media data instances 135 in rows 320 along timeline 310. Each media data instance 135 is placed at a position relative to timeline 310 that corresponds to the media capture start time and stop time. Time-based media editor 125 selects the row 320 for each media data instance 135 such that overlapping media data instances are placed on different rows 320. The media data instance 135 can be represented as a linear segment (as shown in FIG. 3) or cell, or any other suitable linear representation. The representation may also include an icon, thumbnail image, filename, text, or other mechanism to identify a particular media data instance 135 to the user. The representation may also visually distinguish between different media data instances 135, for example, by using linear segments of different colors.

After displaying selected media data instances 135 in conjunction with timeline 310, processing continues at block 440, where editor 125 applies a style 220, such as an overlap style, to frames in the overlapping time regions 330 (FIG. 3). In some embodiments, the actions of block 440 are triggered by a user action such as a button or menu item selection. In other embodiments, the actions of block 440 occur a result of a user selecting media data and a style.

The application of style 220 in block 440 produces new frames corresponding to the overlapping region of the media data instance 135. These newly created frames are a combination of one frame from each input media data instance 135. For example, when the style is horizontal tiling, media editing engine 230 produces a series of new frames, each of which horizontally tiles a frame from the time overlap region of the first input media data instance 135 with a corresponding frame from the time overlap region in the second media data instance 135.

At block 450, editor 125 includes an audio track to accompany the media frames/slideshow. Inclusion of this audio track may be accomplished by applying an audio style to the media data output. The audio track may be obtained in various ways. The audio track used in block 450 may be the audio track from one of the media data inputs 135, and the user may make the selection. For example, a user can select as output an audio track from either main audio or another video stream (e.g., PIP). The audio track used in block 450 may be a digital audio file identified by a user. The digital audio file may be one provided by a user, or it may be selected from a set of digital audio files included with, downloaded by, or provided by editor 125. Alternatively, the audio style may specify no audio (mute) rather than an audio track. Finally, at block 450, editor 125 generates a media data output 240 (FIG. 2) which includes the new frames produced in block 440 as well as frames from non-overlapping regions of the selected media data instance 135.

Figure 5:
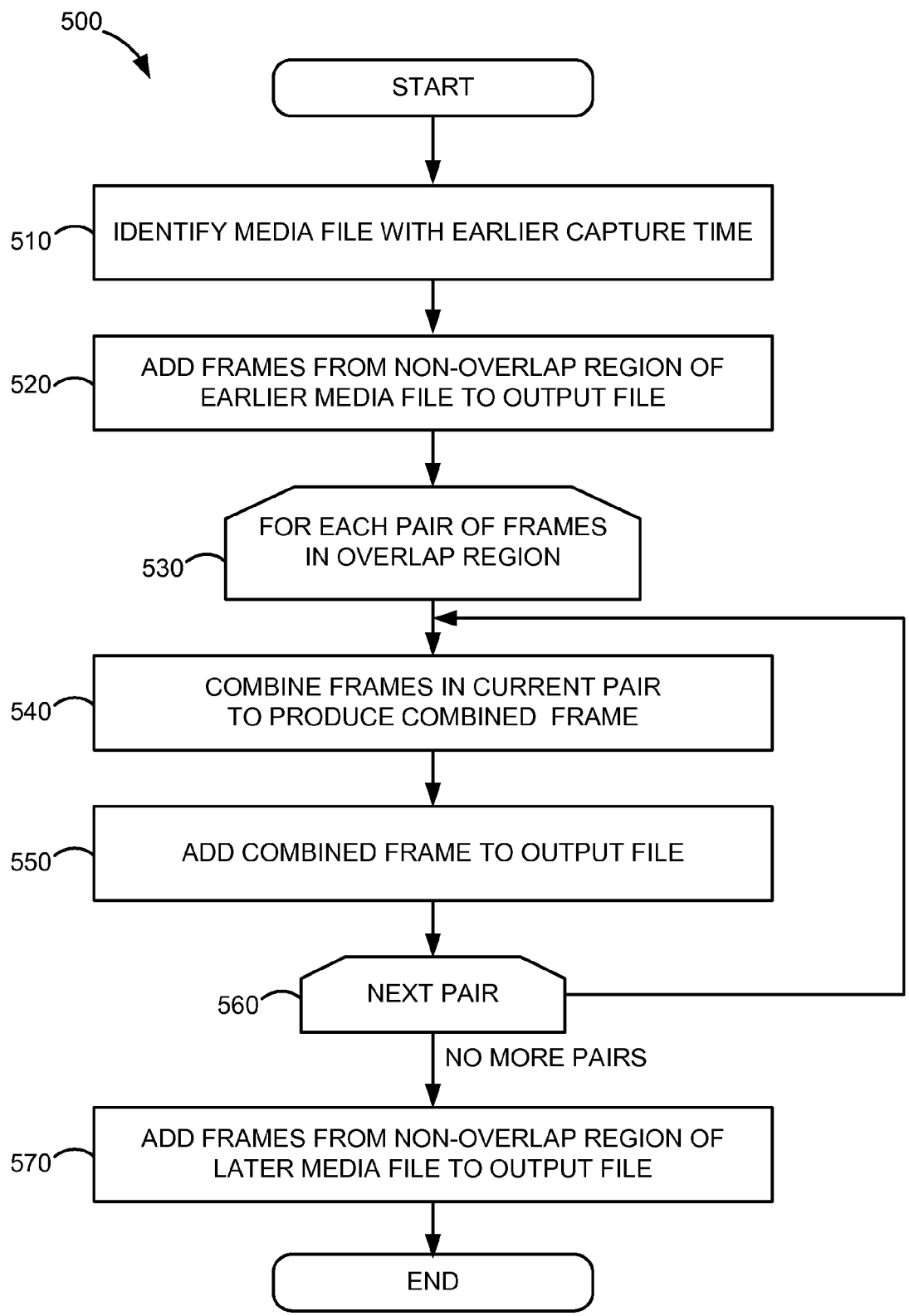
FIG. 5 is a flowchart describing the application of overlap styles, according to some embodiments.

FIG. 5 is a flowchart describing in more detail the application of overlap styles and generation of media data output 240, according to some embodiments of time-based media editor 125. In some embodiments, the style 220 is selected by the user from a group of styles. A default style may also be used if a user has not selected one. The process of FIG. 5 is discussed in terms of combining two media data instances 135 which overlap in time, but can be extended to more than two.

Method 500 begins at block 510, where time-based media editor 125 identifies which of the two media data inputs 135 has an earlier capture time, and identifies the non-overlapping region(s) of the earlier media data input 135. At box 520, time-based media editor 125 then adds the frames from the non-overlapping region of the earlier media data input 135 to media data output 240. Having handled the first region of the combined media data output 240, time-based media editor 125 begins an iteration loop to handle frames in the overlap region 330 of the two media data instances 135.

In FIG. 5, the overlap region corresponds to two media data instances 135, and can thus be viewed a series of frame pairs. Each frame within a pair belongs to a different media data instance 135 but corresponds to the same point on the timeline (i.e., each frame in the pair has the same timestamp). The iteration loop starts at block 530 with the first pair in the overlap region. The iteration loop includes blocks 540 and 550, and advances to the next pair in the overlap region at block 560.

At block 540, time-based media editor 125 combines the frames in the current pair to produce one output frame. The combination is performed according to the style 220, such as an overlap style, and may involve scaling of the images, obscuring part of one image with another image, applying a transparency effect to one or more images, or any combination thereof. Examples of styles 220 include horizontal and/or vertical tiling and picture-in-picture. Style 220 further encompasses any mechanism for combining images from two frames into a single frame.

In another embodiments, a multiple angle style is applied at block 540 rather than an overlap style 220. The multiple angle style is useful when the same scene is captured by different devices at the same time, each device capturing from a different angle. The result is multiple frames having the same timestamp. The multiple angle style does not combine the frames taken from different angles into a single frame, but instead includes all of the multiple angle frames while adjusting the timestamps appropriately.

Processing continues at block 550, where the combination frame generated at block 540, or the series of frames generated at block 540 for a multiple angle style, is added to media data output 240. The timestamp of the combination frame is the same as the timestamp of the pair of source frames from overlap region 330. That is, the new combination frame appears at the same time position in media data output 240 as the source frames do in the media data inputs 135.

Time-based media editor 125 advances to the next pair at block 560, until all pairs have been processed. When all pairs in the overlap region have been handled by the iteration loop, time-based media editor 125 moves to block 570, where the frames from the non-overlapping region of the later media data input 135 are added to media data output 240. Method 500 is then complete.

Time-based media editor 125 produces a properly sequenced output file 240 which contains a first segment from the earliest media data instance 135, a middle segment which combines multiple media data instances 135 according to style 220, and a final segment from the latest media data instance 135. This process will now be further explained with reference to FIG. 6, which provides a graphic illustration of the combination process.

Figure 6:
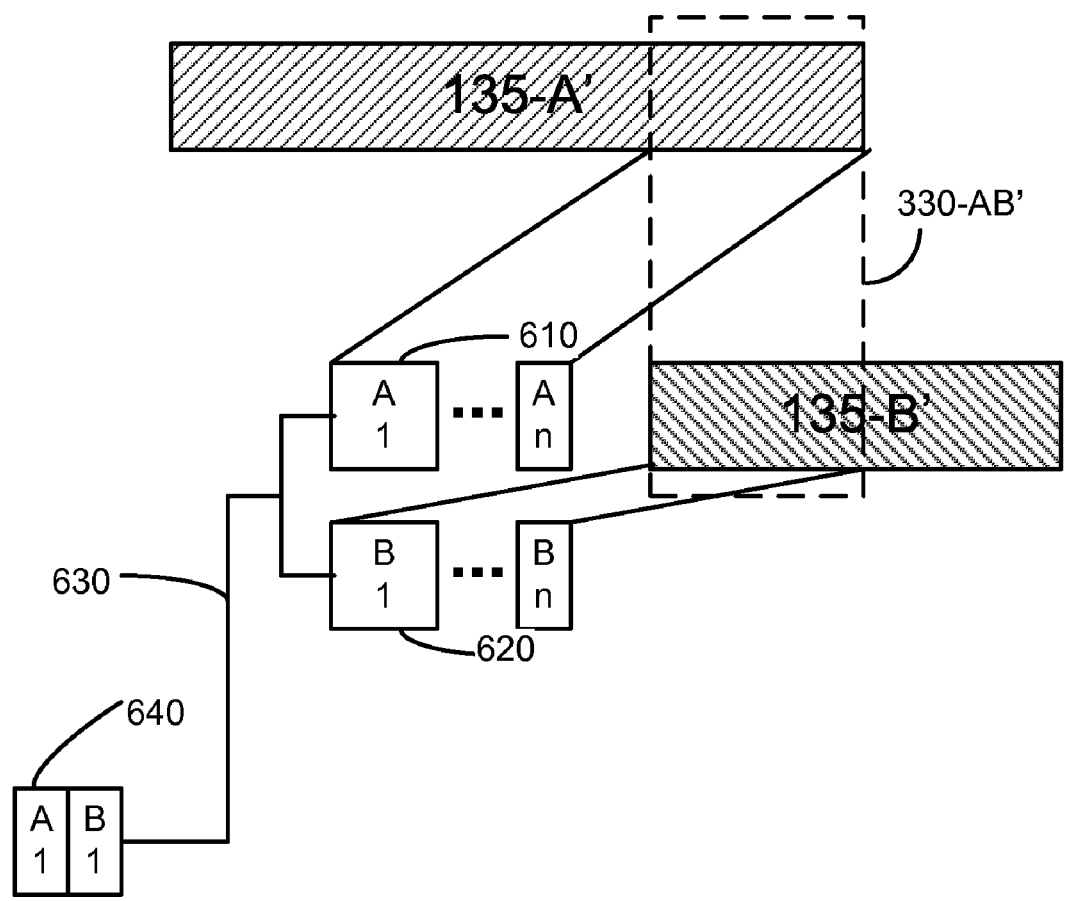
FIG. 6 illustrates a process for combining overlapping regions, according to some embodiments.

As shown in FIG. 6, media data 135-A' overlaps with media data 135-B' at overlap region 330-AB'. Overlap region 330-AB' includes individual frames 610 from media data 135-A' and individual frames 620 from media data 135-B. Media editing engine 230 performs a combination action 630 according to the style 220. In the example scenario of FIG. 6, the combination action 630 is vertical tiling. Action 630 produces combined frame 640, which media editing engine 230 adds to media data output 240.

Figure 7:
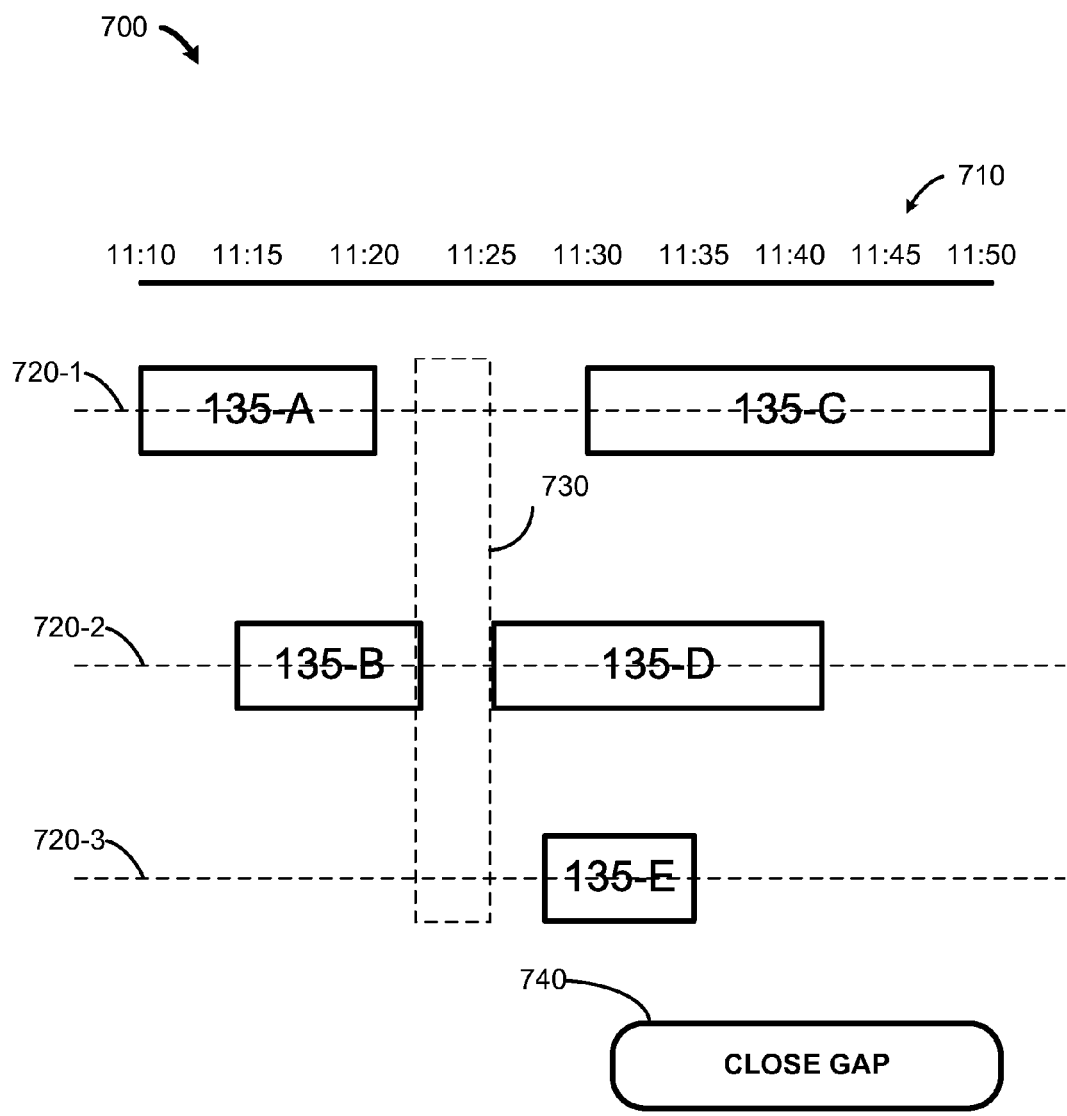
FIG. 7 illustrates a set of media data instances having a time gap, according to some embodiments.

Various embodiments of media editing system 100 handle overlapping time regions of media data instances 135 as described above. Some embodiments of time-based media editor 125 handle missing time regions, or gaps, in a continuous time sequence by moving media data around on the timeline to remove time gaps. FIG. 7 illustrates a gap in a time sequence. Window 700 is similar to window 300 (FIG. 3), and includes the same five instances of media data (135-A to 135-E) arranged in three rows (720-1 to 720-3) beneath timeline 710. A time gap 730 exists between media data 135-B, which ends at 11:22 and media data 135-D, which starts at 11:26. When a user clicks button 740, media editing engine 230 creates an output file 240' without time gap 730. Media editing engine 230 may remove time gap 730 by moving media data 135-B later in time, so that media data 135-B ends at 11:26. Media editing engine 230 may also remove time gap 730 by moving media data 135-D earlier in time, so that media data 135-D starts at 11:22. This movement is accomplished, for example, by changing the time codes of frames in the appropriate one of the media data 135, to an earlier or a later time, respectively. The direction of movement may be set by the user through a control, dialog box, menu, list box, etc.

Other embodiments of media editing system 100 handle missing time regions, or gaps, in a continuous time sequence by inserting frames into the time gap. The frames inserted into the time gap may represent an advertisement, a transaction, a news story or event, where these inserted frames are selected from frames included with, downloaded to, or provided by editor 125. The frames inserted into the time gap may also be frames from a media data, a photo file, or a slideshow file selected by the user. A predefined style may be applied to the inserted frames.

Figure 8:
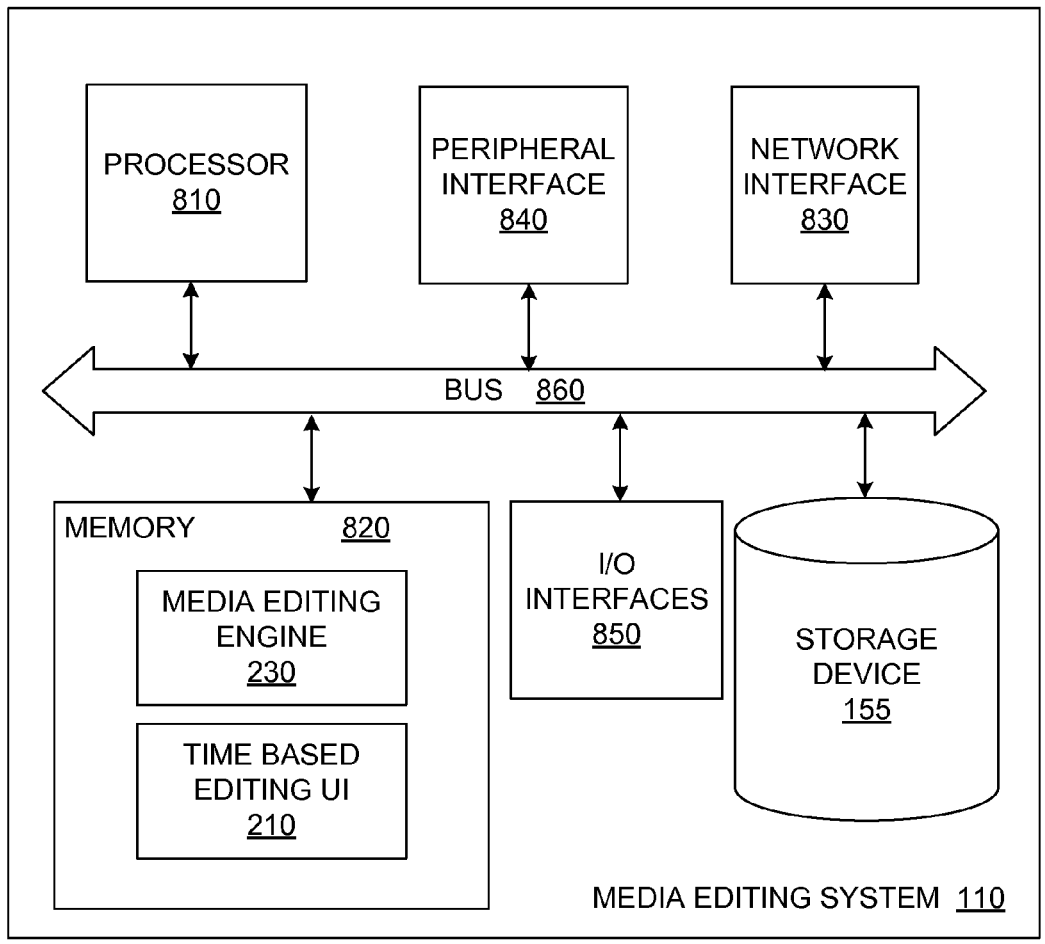
FIG. 8 is a block diagram of the media editing system from FIG. 1, according to some embodiments.

FIG. 8 is a block diagram of media editing system 100, according to some embodiments disclosed herein. System 100 includes a processor 810, memory 820, a network interface 830, a peripheral interface 840, a storage device 140 (e.g., non-volatile memory or a disk drive), and one or more input output (I/O) interfaces 850. These hardware components are coupled via a bus 860. Omitted from FIG. 8 are a number of components that are unnecessary to explain the operation of media editing system 100.

The components discussed above (e.g., time-based media editing user interface 210 and media editing engine 230) can be implemented in software (i.e., instructions executing on a processor), and in such an implementation, memory 820 stores these components. These components can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). Persons of ordinary skill should also appreciate that these components may be implemented using any combination of hardware and software.

In some embodiments of media editing system 100, the software components are stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method for editing media data, the method comprising:
displaying a representation of a first media data instance and a second media data instance, each of the media data instances displayed along a corresponding one of a plurality of lines at a corresponding one of a plurality of positions, each corresponding position chosen in accordance with a capture time associated with the media data instance;
determining an overlap region for a first media data instance and a second media data instance, the first media data instance and the second media data instance having overlapping capture times, such that when the media data instances have overlapping capture times the media data instances with overlapping capture times are displayed on different ones of the lines; and
combining a plurality of frames within the overlap region according to an overlap style to produce an output media data, wherein the first media data instance and the second media data instance are captured from different sources.

2. The method of claim 1, further comprising: receiving a user selection of the first media data instance and the second media data instance.

3. The method of claim 1, wherein the each of media data instance is captured from a video capture device, a storage disk, a camera, or a web server.

4. The method of claim 1, wherein the each of media data instance comprises a video, a slideshow, or an image.

5. The method of claim 1, further comprising: adding a non-overlapping region of the first media data instance and a non-overlapping region of the second media data instance to the output media data.

6. The method of claim 1, further comprising: displaying a timeline in conjunction with the media data instances.

7. The method of claim 1, wherein the position for each of the media data instance is aligned with a corresponding position on the timeline based on the capture time associated with the media data instance.

8. The method of claim 1, wherein the overlap style is a predefined overlap style.

9. The method of claim 1, wherein the overlap style is a user-defined overlap style.

10. The method of claim 1, wherein a time gap exists between the first media data instance and the second media data instance, the method further comprising: creating the output file without the time gap, by skipping the time gap between the first media data instance and the second media data instance.

11. The method of claim 1, the method further comprising: filling at least a portion of a time gap between the first media data instance and the second media data instance with an advertisement, a transaction, a news story, or a news event.

12. The method of claim 1, wherein combining the overlap region of the first media data instance and of the second media data instance according to an overlap style to produce the output media data comprises synchronously displaying each frame which belongs to a different one of the first media data instance and of the second media data instance at the same point on the timeline.

13. The method of claim 1, wherein combining the overlap region of the first media data instance and of the second media data instance comprises applying the overlap style to the overlap region and synchronously displaying the overlap region with a multiple angle style, vertical tiling style, horizontal tiling style, picture in picture style, or wide angle style.

14. A computing device for editing media data comprising:
   memory having executable instructions stored thereon; and
   a processor configured by at least a portion of the executable instructions retrieved from the memory to:
      display a representation of a first media data instance and a second media data instance, each of the media data instances displayed along a corresponding one of a plurality of lines at a corresponding one of a plurality of positions, each corresponding position chosen in accordance with a capture time associated with the media data instance;
      determine an overlap region for the first media data instance and the second media data instance, the first media data instance and the second media data instances having overlapping capture times, such that when the media data instances have overlapping capture times the media data instances with overlapping capture times are displayed on different ones of the lines; and
      combine a plurality of frames within the overlap region according to an overlap style to produce an output media data, wherein the first media data instance and the second media data instance are captured from different sources.

15. The computing device of claim 14, wherein the each of media data instance is captured from a video capture device, a storage disk, a camera, or a web server.

16. The computing device of claim 14, wherein the processor is further configured to: add a non-overlapping region of the first media data instance and a non-overlapping region of the second media data instance to the output media data.

17. The computing device of claim 14, wherein the processor is further configured to: display a timeline in conjunction with the media data instances.

18. The computing device of claim 14, wherein the overlap style is user selected from a plurality of overlap styles.

19. The computing device of claim 14, wherein the overlap style comprises multiple angle, vertical tiling, horizontal tiling, picture in picture, wide angle, or combinations thereof.

20. The computing device of claim 14, wherein the capture time represents an actual time having a base common to the first media data instance and the second media data instance.

21. A system for editing media data comprising:
   at least one computing device; and
   an executable in the at least one computing device, the executable comprising:
      logic that displays a representation of a first media data instance and a second media data instance, each of the media data instances displayed along a corresponding one of a plurality of lines at a corresponding one of a plurality of positions, each corresponding position chosen in accordance with a capture time associated with the media data instance, such that when the media data instances have overlapping capture times the media data instances with overlapping capture times are displayed on different ones of the lines;
      logic that determines an overlap region for the first media data instance and for the second media data instance, the first media data instance and the second media data instance having overlapping capture times; and
      logic that combines a plurality of frames within the overlap region according to an overlap style to produce an output media data, wherein the first media data instance and the second media data instance are captured from different sources.

22. The system of claim 21, wherein the each of media data instance is captured from a video capture device, a storage disk, a camera, or a web server.

23. The system of claim 21, further comprising: logic that adds a non-overlapping region of the each of media data instance and a non-overlapping region of the second media data instance to the output media data.

24. The computing device of claim 21, wherein the logic that displays further comprises logic that displays a timeline in conjunction with the media data instances.

25. The computing device of claim 21, wherein the position for each of the media data is aligned with a corresponding position on the timeline based on the capture time associated with the media data instances.

26. The computing device of claim 21, further comprising receiving a user selection of the plurality of media data instances.

27. The computing device of claim 21, wherein the overlap style is user selected from a plurality of overlap styles.

28. The computing device of claim 21, wherein the overlap style comprises vertical tiling, horizontal tiling, picture in picture, wide angle, or combinations thereof.

29. The computing device of claim 21, wherein the capture time associated with the media data instances represents an actual time with a base that is common to the plurality of media data instances.

* * * * *